United States Patent [19]

Reed

[11] Patent Number: 4,487,754

[45] Date of Patent: Dec. 11, 1984

[54] SYSTEM AND PROCESS FOR PRODUCING AND RECOVERING ELEMENTAL SULFUR

[75] Inventor: Robert L. Reed, Tulsa, Okla.

[73] Assignee: Standard Oil Company (Indiana), Chicago, Ill.

[21] Appl. No.: 518,504

[22] Filed: Jul. 29, 1983

[51] Int. Cl.³ .............................................. C01B 17/04
[52] U.S. Cl. ................. 423/574 R; 423/576; 422/115; 422/171
[58] Field of Search ............... 423/574 R, 574 G, 576; 422/115, 171, 190

[56] References Cited

U.S. PATENT DOCUMENTS

| Re. 28,830 | 5/1976 | Hunt, Jr. et al. | 423/574 R |
|---|---|---|---|
| 2,767,062 | 10/1956 | Duecker | 423/576 |
| 4,035,474 | 7/1977 | Kunkel et al. | 423/574 R |
| 4,180,554 | 12/1979 | Goddin, Jr. et al. | 423/574 R |
| 4,309,402 | 1/1982 | Al-Muddaris | 423/574 R |
| 4,315,904 | 2/1982 | Lell et al. | 423/574 R |

FOREIGN PATENT DOCUMENTS 938087  12/1973  Canada ........................ 423/574 R

OTHER PUBLICATIONS

"MCRC Process for Improving Claus Plant Recovery"-A. B. Coady 6-9-1976: Presented to Canadian Natural Gas Processor's Association.
"MAXISULF-A Process to Enhance Sulphur Recovery in Claus Plants"-R. Lell and U. Neumann, Davy McKee AG.
"The MCRC Sub-Dewpoint Sulphur Recovery Process"-R. E. Heigold and D. E. Berkeley, Delta Projects Limited.

Primary Examiner—Earl C. Thomas
Assistant Examiner—Jeffrey E. Russel

[57] ABSTRACT

A straight-through four reactor system and process is disclosed for obtaining high levels of sulfur recovery from acid gas at a cost equal to or less than that required for a standard modified four reactor Claus system. Two conventional Claus reactors and two cold bed adsorption (CBA) reactors are in series. Four condensers are provided, one disposed before each of the Claus and CBA catalytic reactors. A first heater and a first bypass line is disposed between the second condenser and the second catalytic reactor (second Claus reactor) and a second heater and a second bypass line is disposed between the third condenser and the third catalytic reactor (first CBA reactor). The system is designed to operate either with both CBA reactors in a recovery mode or with one CBA reactor in a regeneration mode and the other CBA reactor in a recovery mode. When both reactors are operating in the recovery mode, the system is similar to the standard modified Claus system. But when one of the CBA reactors is in a regeneration mode, effluent from the third condenser is heated in the second heater and directed to the CBA reactor on regeneration. Sulfur is vaporized from the regenerating CBA reactor and is recovered in the fourth condenser. Effluent from the fourth condenser is then passed through the CBA reactor in recovery mode before it passes to the incinerator.

6 Claims, 3 Drawing Figures

SYSTEM AND PROCESS FOR PRODUCING AND RECOVERING ELEMENTAL SULFUR

BACKGROUND OF THE INVENTION

This invention relates to processes and systems for producing elemental sulfur. In particular, it relates to recovering elemental sulfur from acid gas using an improved modified Claus process.

The Claus process is widely used by the industry for the production of elemental sulfur. The process is designed to carry out the Claus reaction:

$$2H_2S + SO_2 \xrightarrow{\text{catalyst}} 2H_2O + 3S$$

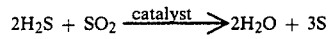

The reaction is favored by decreased temperature and by removal of elemental sulfur vapor.

In the conventional Claus process, the operating conditions of the reactors in which the Claus reaction is carried out are selected to maintain elemental sulfur in the vapor state. Otherwise, the elemental sulfur would deposit on the catalyst and deactivate it. To assure high conversion levels, the reaction is carried out in a plurality of consecutive reactors. Elemental sulfur is condensed and removed from the effluent of a preceding reactor before it is passed to a subsequent reactor. The removal of sulfur permits the reactors to be maintained at progressively reduced temperatures.

Generally, the desired recovery levels necessitate the use of a modified Claus process which includes a thermal reactor, two catalytic reactors and two low temperature catalytic reactors, such as cold bed adsorption (CBA) reactors. The reaction in a CBA reactor is generally carried out at an inlet temperature range from about 250°–280° F. (121°–138° C.) which results in the condensation of elemental sulfur on the alumina catalyst. The low temperatures in the CBA reactor favor the reaction and the condensation of sulfur removes it from the reaction phase, thereby allowing more $H_2S$ and $SO_2$ to react. The sulfur condensing on the catalyst deactivates it. Accordingly, a second CBA reactor is provided so that while the first CBA is in the recovery mode, the second reactor is being regenerated and vice versa.

Although presently acceptable recovery rates can be achieved by the above-described modified Claus process, environmental considerations may soon require improved recovery rates. However, the capital costs and expenditures for the standard modified Claus process are already quite high. In order to keep pace with growing environmental concerns, there exists a need to improve this standard modified Claus process so that higher recovery levels can be obtained without added expenditures.

Recovery levels in standard modified Claus processes are limited by a variety of factors. One such factor is that the recovery is usually significantly diminished by leaks in switching valves. There are two reasons for this. First, effluent from the first catalytic reactor is used as regeneration gas. This regeneration gas is relatively rich in sulfur species: the total sulfur in this stream may be equivalent to about 5 to 10% by volume. Therefore, even a small leak of this stream into the tail gas can significantly increase the sulfur loss. Second, since the regeneration gas is rich in sulfur, the piping for carrying it must be made of expensive noncorrosive materials. This adds to the overall cost of the system.

Third, regeneration gas flow is routed to the reactor on regeneration by introducing a pressure differential in the flow stream between the first reactor effluent and the second condenser inlet. This results in a significant pressure difference between the reactor on regeneration and that on absorption. This pressure differential may be as much as 5 psi. It is difficult to find large diameter valves that can give leak-free operation under these conditions. Butterfly valves are not generally satisfactory, and it has been necessary to use very expensive steamjacketed globe valves of German manufacture on the critical valve locations in CBA plants in order to maintain high recovery levels.

Another factor that limits recovery is catalyst deterioration caused by thermal stresses introduced during heating or cooling. Also, unregenerated cold spots in the bed further reduce efficiency of the system. Still further, catalyst efficiency is limited by the equilibrium level of absorbed sulfur upon regeneration.

Thus, the standard modified Claus processes suffer from several drawbacks. There presently exists an unsatisfied need for an improved modified Claus process and system that will increase recovery levels of sulfur without increasing cost and overcome the above-mentioned drawbacks. The present invention achieves these goals, and, in fact, can potentially decrease costs and increase the recovery levels of sulfur.

BRIEF DESCRIPTION OF THE INVENTION

The present invention significantly improves the efficiency of processes and systems for the production of elemental sulfur from acid gas. The process and system of the present invention achieves an increased recovery rate of elemental sulfur from acid gas using four catalytic reactors in a plant costing less than or about equal to the standard modified Claus system.

The system of the present invention comprises a thermal reactor, two Claus reactors and two CBA reactors. Condensers are disposed on process lines before each of the catalytic reactors. The process of the present invention can operate in two modes simultaneously. At any instant, at least one of the two CBA reactors is in a recovery mode. When only one of the CBA reactors is in recovery mode the other is in a regeneration mode. The effluent from the third condenser (following the second Claus reactor) is used as regeneration gas.

During the normal absorption (recovery) cycle, the process gas flows through the two Claus reactors followed by the two CBA reactors in series. The first CBA reactor gives a theoretical recover of over 99% for most gases. The second CBA reactor increases this recovery by as much as 0.4%. During the normal absorption, or recovery phase, the gas leaving the third condenser (i.e., the condenser following the second Claus reactor) is not reheated and enters the third reactor (i.e., the first CBA reactor) at its dew point. The CBA reactor removes 85% to 90% of the sulfur entering the reactor as $H_2S$ and $SO_2$. The CBA reactor also reduces the sulfur vapor pressure in the effluent gas stream to less than its normal value, since the catalyst acts as a solid absorbent for sulfur. This allows the condenser following the first CBA to operate near the sulfur freezing temperature. The gas leaving the first CBA is cooled in this condenser to at least 260° F. (127° C.) and then enters the fourth reactor (i.e., the second CBA). This reactor removes about 65% to 75% of the sulfur entering the reactor as $H_2S$, $SO_2$ and sulfur vapor.

During this phase of the cycle, the theoretical recovery may be as high as 99.6% to 99.7%.

After a period of time, usually 18 to 24 hours, the first CBA reactor must be regenerated. This is accomplished by heating the effluent from the third condenser to about 650° F. (343° C.) before passing it to the CBA reactor undergoing regeneration. The vaporized sulfur from the regenerating CBA is removed by passing the process steam through a fourth condenser where it is cooled to about 260° F. (127° C.) before passing to the second CBA reactor. The rate at which sulfur is deposited on the catalyst in the second CBA reactor increases during the first CBA reactor regeneration period. This is because the reverse Claus reaction occurs during part of the regeneration cycle.

Because of the lower loading rate during the normal absorption cycle, the second CBA reactor requires regeneration only once for about every two to three cycles of the first CBA reactor. In practice, however, each CBA reactor could be regenerated two or three times consecutively while the other CBA reactor is operated in the recovery mode. The valves could then be switched so that the previously regenerating reactor operates in recovery mode while the other reactor is being regenerated.

DETAILED DESCRIPTION OF THE INVENTION

Figure 1:
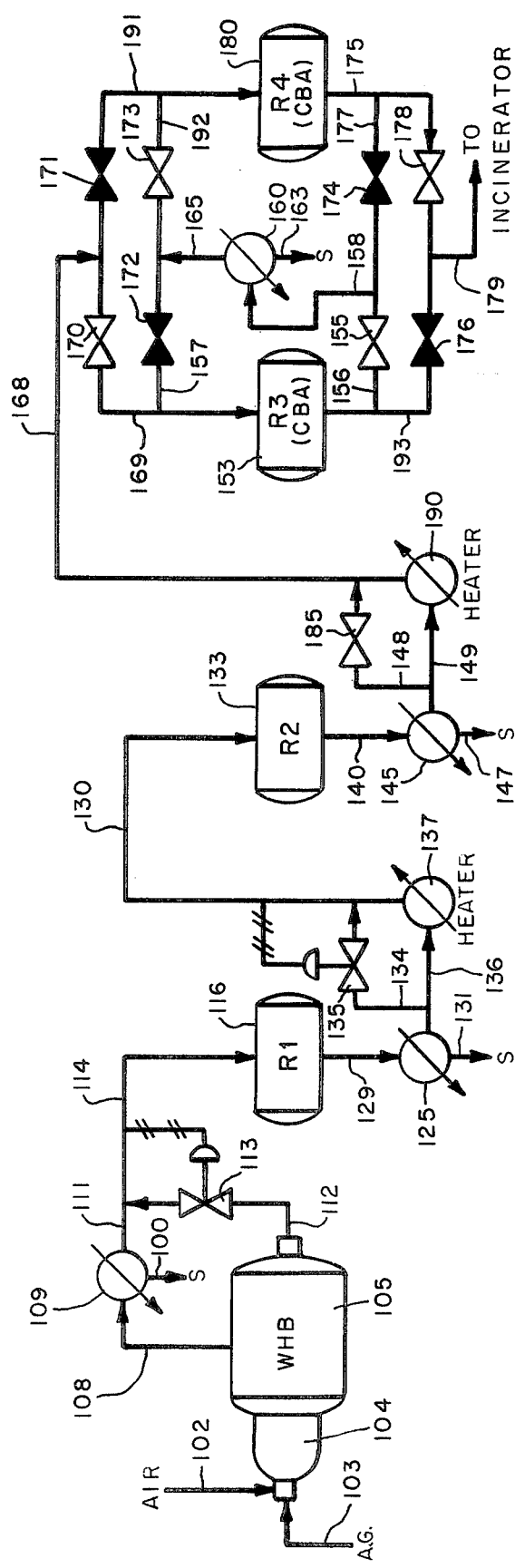
FIG. 1 is a schematic of a preferred embodiment of the process and the system of the present invention with both CBA reactors operating in the recovery mode.

The present invention provides a process and a system for highly efficient production of elemental sulfur. The efficiency of the system is achieved by providing a straight-through process and using for regeneration effluent from a condenser in the process flow path immediately preceding the CBA reactors. The process and system of the present invention offer further advantages in eliminating the need for several expensive parts of the conventional CBA system. The thermal stresses on the catalyst introduced during heating and cooling are reduced. Also, the amount of noncorrosive steel used in piping is reduced over the conventional CBA process.

The system of the present invention is designed to operate either solely in the recovery mode or simultaneously in both the recovery mode and the regeneration mode. In the recovery mode, acid gas and air are fed into a conventional Claus thermal reactor. The effluent from the thermal reactor is cooled in a waste heat boiler, passed through a first condenser to remove sulfur and fed into a first catalytic Claus reactor. The effluent from the first catalytic reactor at temperature in the range of about 550°–700° F. (288°–371° C.) is passed through a second condenser to remove additional sulfur. The gas stream from the second condenser is heated and passed to a second catalytic Claus reactor at an inlet temperature in the range of about 350°–450° F. (177°–232° C.). The effluent from the second catalytic reactor is passed through a third condenser where more elemental sulfur is recovered, and then the gas stream is fed into a first low temperature catalytic reactor such as a cold bed absorption (CBA) reactor at a temperature in the range of about 250°–280° F. (121°–138° C.) which results in the condensation of elemental sulfur on the alumina catalyst. The gas leaving the first CBA reactor is passed to a fourth condenser where it is cooled at least to 260° F. (127° C.) and possible to as low as 245° F. (118° C.). The gas then enters a second CBA reactor. During this phase of the cycle, the theoretical recovery may be as high as 99.6% to 99.7%.

After a period of time, usually 18–24 hours, the first CBA reactor must be regenerated. When the CBA reactor is in the regeneration mode, gas from the third condenser is forced through a regeneration heater where it is heated to about 650° F. (343° C.). This entire gas stream then can enter the CBA reactor undergoing regeneration. By utilizing the entire process stream, as is preferred, for regeneration better flow distribution through the reactor undergoing regeneration can be achieved and the formation of solid composites of sulfur and catalyst (sulfur clinkers) can be diminished. Less than the entire stream can, of course, also be utilized. Since this stream is now at a high temperature of about 650° F. (343° C.), it vaporizes sulfur deposited on the catalyst and thereby restores the catalytic activity.

The effluent from the first CBA reactor is cooled in the fourth condenser and additional sulfur is recovered. Then effluent from the fourth condenser is passed, at a temperature of about 260° F. (127° C.), to the second CBA reactor. The effluent from the second CBA reactor is then removed to the incinerator.

DESCRIPTION OF THE PREFERRED EMBODIMENT OF THE PRESENT INVENTION

Figure 2:
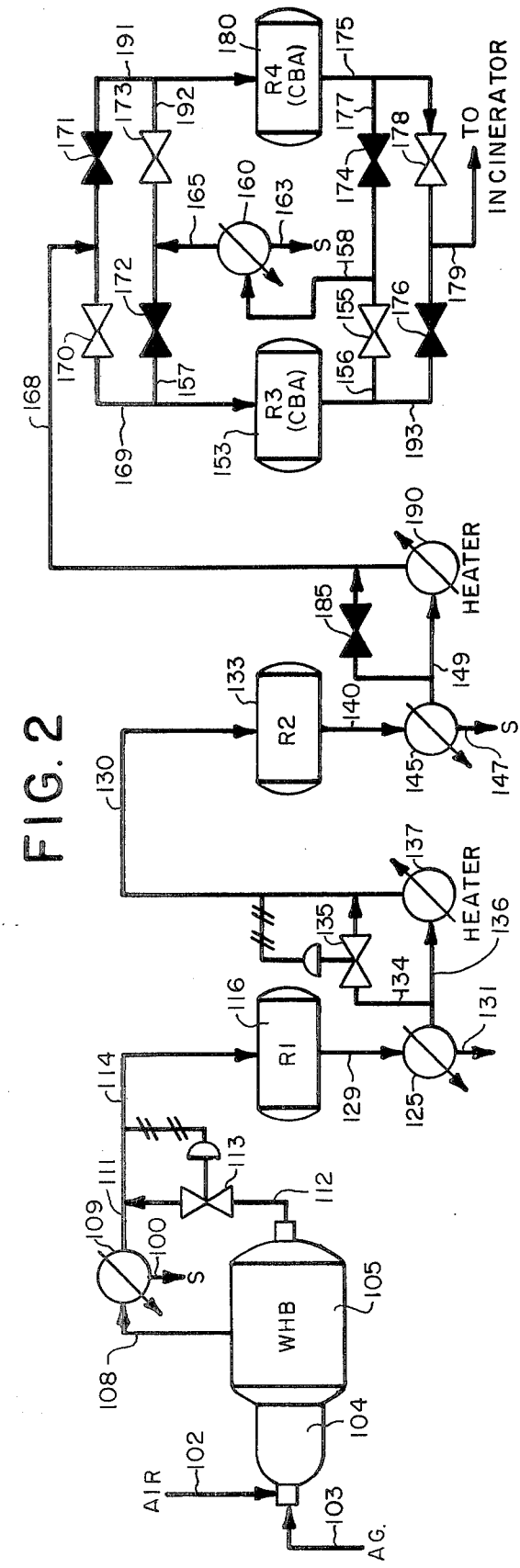
FIG. 2 is a schematic of a preferred embodiment of the process and the system of the present invention where the second CBA reactor is operating in the recovery mode and the first CBA reactor is operating in the regeneration mode.
Figure 3:
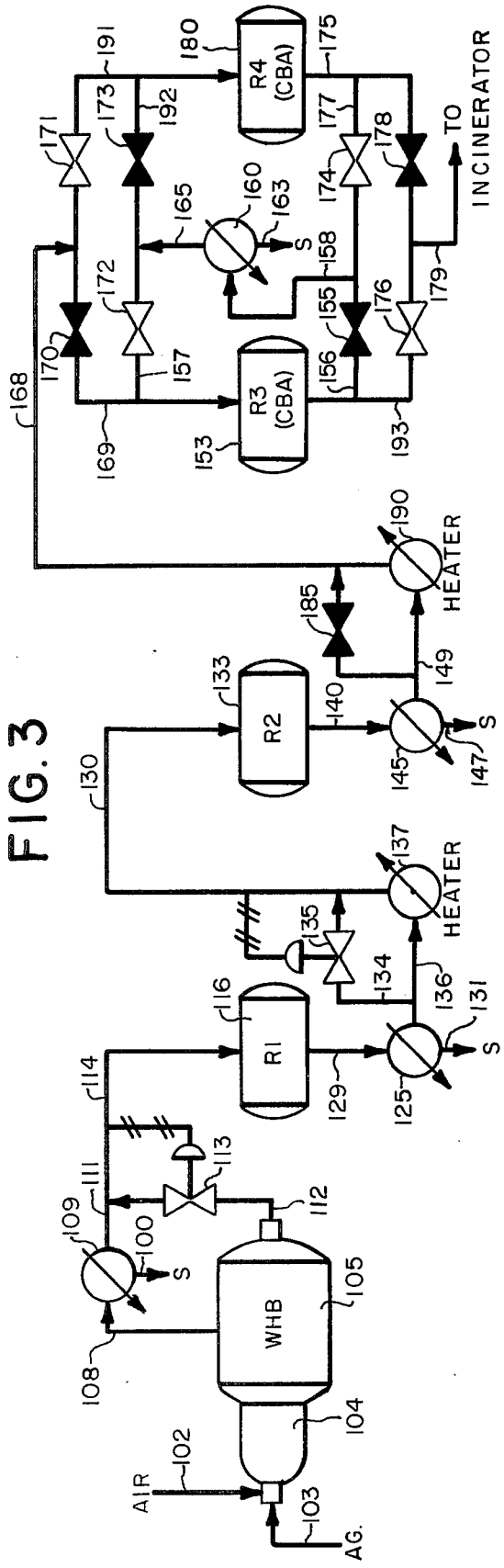
FIG. 3 is a schematic of a preferred embodiment of the process and system of the present invention where the first CBA reactor is operating in the recovery mode and the second CBA reactor is operating in the regeneration mode.

FIGS. 1, 2 and 3 depict the preferred embodiment of the process and the system of the present invention. FIG. 1 shows the operation of the process of the present invention when both catalytic reactors are in the recovery mode, FIG. 2 shows the operation of the process of the invention when only the second catalytic reactor is in the recovery mode, and FIG. 3 shows the operation and process of the present invention when only the first catalytic reactor is in the recovery mode. Like-numbered elements in the three FIGURES refer to identical elements. Further, to facilitate following the flow of the process streams according to the invention, open valves are shown unblackened and closed valves are shown blackened.

Referring now to FIG. 1, air and acid gas are fed into a thermal reactor 104 via lines 102 and 103, respectively. Effluent gases from the thermal reactor 104 are cooled in a waste heat boiler 105. The resulting gases at about 550° F. (288° C.) are passed via a line 108 to a first condenser 109 which condenses vaporized sulfur. The gases leave the first condenser 109 via a line 111 at about 400° F. (204° C.). Sulfur is removed from condenser 109 via a line 100 and recovered.

Hot gas from the waste heat boiler 105 may be introduced via a line 112 and a valve 113 into the gas stream 111 leaving the first condenser 109, such that the resulting gas stream 114 is about 450°–600° F. (232°–316° C.). The gas stream 114 is passed to a first catalytic reactor 116 where further conversion of $H_2S$ and $SO_2$ into elemental sulfur takes place. The effluent from the first catalytic reactor 116 is passed through a second condenser 125 via a line 129. The elemental sulfur is recovered from the condenser 125 via a line 131. The resulting gaseous stream is then divided. One portion is passed via a first bypass line 134 through a first bypass valve 135 and the other portion is passed via a line 136 through a heater 137. The two portions then are combined and the resulting stream passes through a line 130 into a second catalytic reactor 133. The temperature of the gas fed into the second catalytic reactor is controlled using the bypass line 134 with the valve 135. The temperature of the gas stream in line 130 is generally in the range or about 350°–450° F. and preferably 375°–425° F.

In the second catalytic reactor 133 further conversion of $H_2S$ and $SO_2$ into elemental sulfur takes place. The effluent from the second catalytic reactor 133 is passed via a line 140 into a third condenser 145. Resulting elemental sulfur is recovered from the third condenser 145 via a line 147.

The gas stream leaves the third condenser 145 at a temperature of about 260° F. (127° C.) and it is passed via a second bypass line 148 through a second bypass valve 185, a line 168, a valve 170 and a line 169 to a first CBA reactor (the third catalytic reactor) 153. The first CBA reactor inlet 153 preferably is maintained at a temperature in the range of about 250° F. to 280° F. (121°–138° C.). In this first CBA reactor 153 further reaction of $H_2S$ and $SO_2$ to produce elemental sulfur and water occurs. The sulfur produced is adsorbed on the catalyst surface. About 85 to 90% of the sulfur entering the reactor as $H_2S$, $SO_2$ and elemental sulfur is recovered as absorbed sulfur on the catalyst. The effluent from the first CBA reactor 153 is passed through a line 193, a line 156 and a valve 155 and then via a line 158 to a fourth condenser 160. During this portion of the cycle sulfur is not normally recovered as essentially all elemental sulfur is absorbed on the catalyst in reactor 153. The gas is cooled in the fourth condenser 160 at least to 260° F. (127° C.) and possibly to as low as 245° F. (118° C.).

The gas stream then leaves the fourth condenser 160 via line 165, a valve 173, a line 192 and a line 191 to the second CBA reactor (the fourth catalytic reactor) 180. In this second CBA reactor 180 (the fourth catalytic reactor), further conversion of the $H_2S$ and $SO_2$ to sulfur occurs and the sulfur is adsorbed on the catalyst. From about 25 to 75% of the sulfur entering the reactor as $H_2S$, $SO_2$, and sulfur vapor is recovered in this reactor. The gas stream leaves the second CBA reactor 180 via line 175, valve 178 and line 179 to the incinerator. During this phase of the cycle, the theoretical recovery may be as high as 99.6 to 99.7%. Actual recovery will be close to theoretical if operation is steady and if precise control of the air to the furnace is achieved. When both CBA reactors are in recovery mode, the second CBA reactor 180 loads at a much lower rate than the first CBA reactor 153.

The operation with both reactors operating in the recovery mode is continued until the catalyst in the first CBA reactor 153 becomes significantly deactivated by sulfur deposits. At that point, the operation of the system is switched to one of the regeneration modes shown in FIGS. 2 and 3.

Referring now to FIG. 2, the effluent gases from the third condenser 145 are forced through a regeneration heater 190. This is accomplished by closing the second bypass valve 185 so that the gases are taken via a line 149 to the heater 190. In the heater 190, the gases are heated to about 650° F. (343° C.) before they are passed via the line 168 through the valve 170 and the line 169 into the regenerating CBA reactor 153.

In the regenerating CBA reactor 153, the hot gas causes the sulfur absorbed on the alumina catalyst to vaporize. During the period when sulfur is being actively vaporized from the catalyst, commonly referred to as the "plateau" period, the reverse Claus reaction occurs:

$$3S + 2H_2O \rightarrow 2H_2S + SO_2$$

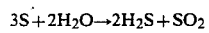

The amount of the reverse Claus reaction which occurs is a function of the plateau temperature and the partial pressure of the sulfur vapor in the gas stream. Most of the sulfur that is vaporized from the catalyst is recovered as liquid sulfur from condenser 160 via line 163. That which is present as $H_2S$ and $SO_2$ is recovered as elemental sulfur condensed on the catalyst in the subsequent CBA reactor 180, to the extent of the reaction equilibrium, which is usually about 90%. Thus, high recoveries are possible with this design even during regeneration of one reactor.

Regeneration according to this invention with hot, dilute process gas has decided advantages over the standard practice of using hot, rich process gases (e.g., effluent from the first catalytic reactor 116). First, the catalyst is regenerated to a lower equilibrium level of adsorbed sulfur because of the lower sulfur vapor content of the regeneration gas. Second, the lower $H_2S$ content of the gas results in a lower corrosion rate of the carbon steel in contact with the gas. Third, the recovery is virtually unaffected by leaks in the switching valves. Since the regeneration gas is relatively dilute in sulfur species, a small leak of the regeneration stream into the tail gas will not increase sulfur loss significantly. Further, with the present invention it is no longer necessary to route regeneration gas flow to the regenerating reactor by introducing a pressure differential in the flow stream at the second condenser according to the standard modified Claus process. This standard process results in a pressure difference between the reactor in regeneration mode and the reactor in recovery mode of as much as 5 psi. According to the present invention, however, the pressure differential across the valves is approximately only 1.0 psi, so even if one of the valves does not have a perfect seal, the amount of leakage will be small. Finally, if it is desired to be absolutely certain that no rich gas is lost to the tail gas, only four relatively expensive valves are required.

At the end of the regenerating cycle, a small flow of rich hot gas from the first reactor effluent may be introduced to reduce sulfation of the catalyst if this is found to be a problem. In most plants which do not use inline burners for reactor feed heating this has not been necessary.

The effluent gases from the regenerating reactor 153 at about 245° to 260° F. are passed via the line 156, the valve 155 and the line 158 to the fourth condenser 160. Sulfur is recovered from the condenser 160 via the line 163. Then the effluent is passed via the line 165, the valve 173, the line 192 and the line 191 into the second CBA reactor 180. The second CBA reactor 180 ensures highly acceptable recovery levels even when regeneration is taking place in the first CBA reactor 153. The effluent from the reactor 180 is passed via a line 175, through a valve 178 and via a line 179 into the incinerator (not shown).

Once the elemental sulfur has been vaporized from the catalyst, the reactor bed is ready to be returned to CBA service for a new cycle. But first the bed must be cooled to the sulfur dew point of the inlet gas or below.

Cooling is accomplished by bypassing the regeneration heater 190. Once the regenerated reactor 153 is cooled, the normal recovery cycle as depicted in FIG. 1 can begin again. Note that the second bypass valve 185 may be adjusted during normal operation to force a small amount of gas, less than 5%, through the regeneration exchanger 190. The continuous gas flow reduces the possibility of corrosion occurring in the exchanger which usually occurs in a sulfur plant when flow is stopped in a line or a piece of equipment.

Heat can be supplied to the regeneration exchanger in several different ways. The effluent from the first catalytic reactor 116 can be used. Alternatively, high pressure stream produced in the waste heat boiler 105 can be used. The preferred alternative is a heat exchanger using a heat transfer medium such as Dowtherm vapor. Dowtherm is a tradename for any of a series of heat transfer media comprising eutectic mixtures of diphenyl oxide and diphenyl. The Dowtherm may be heated by the hot process gas, or by a fuel gas fired burner.

FIG. 3 shows the same process as FIG. 2, but in FIG. 3 the second CBA reactor 180 is in the regeneration mode. Valves 171, 172, 174, and 176 are now opened and valves 170, 173, 155 and 178 are now closed. Effluent from the regeneration heater 190 passes via line 168, the valve 171, and the line 191 to the regenerating CBA reactor 180. Elemental sulfur is evaporated in CBA reactor 180 and carried with effluent gases via the line 175, a line 177, the valve 174 and the line 158 to the fourth condenser 160. In the condenser 160 sulfur is collected via the line 163 and effluent gases are passed via the line 165 through the valve 172, the line 157 and the line 169 to the CBA reactor 153. The CBA reactor 153 ensures very high recovery levels even when regeneration is taking place in CBA reactor 180. The effluent from the reactor 153 is passed via the line 193, the valve 176, and the line 179 into the incinerator (not shown).

The following examples are provided for illustrative purpose and are not intended to limit the claimed invention in any manner.

EXAMPLE I

The theoretical recovery levels of sulfur were calculated for the process of the present invention for the following operating conditions and a 58% $H_2S$ acid gas having below specified composition.

Operating Conditions

Recovery Mode

Feed to the first catalytic reactor 116 at about 550° F. (288° C.).

Feed to the second catalytic reactor 133 at about 370° F. (188° C.).

Feed to the third catalytic reactor 153 at about 260° F. (127° C.).

Feed to the fourth catalytic reactor 180 at about 260° F. (127° C.).

Regeneration Mode (catalytic reactor 153 on regeneration)

Feed to the first catalytic reactor 116 at about 550° F. (288° C.).

Feed to the second catalytic reactor 133 at about 370° F. (188° C.).

Feed to the third catalytic reactor 153 at about 260° F. (127° C.).

Feed to the fourth catalytic reactor 180 at about 260° F. (127° C.).

| Composition of Acid Gas | |
|---|---|
| Component | Lb. Mols/hr. |
| $H_2S$ | 371.00 |
| $CO_2$ | 65.12 |
| $H_2O$ | 26.62 |
| $CH_4$ | 1.00 |

The following theoretical sulfur recoveries were obtained:

| Period | Time (Hours) | | Sulfur Recovery (Weight %) |
|---|---|---|---|
| Recovery Mode | 21.8 | | 99.48 |
| Regeneration Mode | | | |
| Heating | 2.0 | | 99.40 |
| Plateau | 1.0 | | 99.30 |
| Soaking | 4.0 | | 99.42 |
| Cooling | 2.0 | | 99.45 |
| Total | 30.8 | Avg. | 99.46% |

This example demonstrates that when an acid gas containing 58% $H_2S$ is used, average recoveries above 99.4 weight percent can be achieved using the process and the system of the present invention and that the recoveries of sulfur fall slightly below 99.4% only for a short period of time.

EXAMPLE II

The theoretical recovery levels of sulfur were calculated for the system operating at the conditions specified in Example I for an 80% $H_2S$ acid gas having the composition specified below.

| Composition of Acid Gas | |
|---|---|
| Component | Lb. Mols/hr. |
| $H_2S$ | 226.80 |
| $CO_2$ | 180.3 |
| $H_2O$ | 26.62 |
| $CH_4$ | 1.00 |

The following theoretical sulfur recoveries were obtained:

| Period | Time (Hours) | | Sulfur Recovery (Weight %) |
|---|---|---|---|
| Recovery Mode | 21.3 | | 99.57 |
| Regeneration Mode | | | |
| Heating | 2.0 | | 99.46 |
| Plateau | 1.0 | | 99.35 |
| Soaking | 4.0 | | 99.46 |
| Cooling | 2.0 | | 99.52 |
| Total | 30.3 | Avg. | 99.54% |

This example demonstrates that when an acid gas containing 80% of $H_2S$ is used, the average recovery of sulfur is above 99.5 weight percent using the process and the system of the present invention. The recovery falls to below 99.5% only for a short period of time during regeneration.

EXAMPLE III

The theoretical recovery levels of sulfur were calculated for a 56% and an 80% H₂S acid gas and compared with theoretical recoveries for a 3-reactor Claus plant and for a conventional (4-reactor) CBA plant. The results are shown below:

|  | 58% H₂S Acid Gas - Theoretical Recovery | 80% H₂S Acid Gas - Theoretical Recovery |
| --- | --- | --- |
| 3-Reactor Claus Plant | 97.15% | 97.42% |
| Conventional CBA | 99.24% | 99.44% |
| Invented Process | 99.46% | 99.54% |

This Example indicates that the invented process improves recovery significantly over the plants of comparison.

By utilizing the process according to the invention problems which can arise due to the valve leakage as hereinbefore described are substantially reduced. The regeneration gas generally contains only 1 to 2% sulfur content by volume. Only during the heatup and plateau periods of regeneration does the regeneration gas contain substantial quantities of sulfur in the form of vapor stripped from the catalyst in the reactor undergoing regeneration. This generally low level of sulfur content can be compared to regeneration gas streams containing as much as 15% by volume sulfur and sulfur compounds in a CBA plant utilizing first catalytic reactor effluent as the regeneration gas stream. Moreover, the pressure differential across the switching valves is approximately 1 psi with the invented process, so that even if the switching valves do not have perfect seals, the amount of leakage will be small. In addition, the period of time during which the regeneration stream is of high sulfur content may account for perhaps only 10% of the entire operating time. Finally, if it is desired to ensure no leakage of rich gas to the tail gas, fewer valves are required.

In summary, the invented process shows in its various aspects the following advantages over a conventional CBA design: (1) higher overall recoveries are achieved (Cf. recoveries in the table in Example III above); (2) the effect of switching valve leakage on overall sulfur recoveries is greatly diminished permitting use of less expensive valves; (3) fewer switching valves are required; (4) by using full process flow during regeneration, better flow distribution in the bed being regenerated is achieved and formation of solids of sulfur and catalyst or sulfur clinkers is less likely to occur; (5) catalyst deterioration due to bed fluidization can be eliminated by using downflow in all operating modes; (6) by regenerating with hot dilute process gas instead of hot rich process gas (a) regeneration can proceed more rapidly and the catalyst can be regenerated to a lower equilibrium content of adsorbed sulfur because of the lower sulfur vapor in the regeneration gas, and (b) the lower hydrogen sulfide content of the regeneration gas can result in a lower corrosion rate of pipes and equipment in contact with the gas.

Many changes and modifications will occur to those skilled in the art upon studying this disclosure. All such changes and modifications that fall within the spirit of this invention are intended to be included within its scope as defined by the appended claims.

I claim:

1. In a four-catalytic reaction zone Cold Bed Adsorption process of the type including the steps of reacting acid gas and air in a thermal reaction zone, reacting the resulting gas in the plurality of catalytic reaction zones arranged in series and maintained at progressively reduced temperatures, the effluent from each catalytic reaction zone being cooled to recover sulfur and the gas being then heated to a desired temperature and fed to the subsequent catalytic reaction zone, the last two of said catalytic reaction zones each being periodically maintained below the dew point of sulfur for the recovery of sulfur and the catalyst in each of said last two catalytic reaction zones being periodically regenerated, the improvement comprising:

operating all four catalytic reaction zones in series for the recovery of sulfur, the last two catalytic reaction zones being periodically simultaneously maintained in series below the dew point of sulfur, for the recovery of sulfur and periodically effecting regeneration of one of the last two catalytic reaction zones operated below the dew point of sulfur, the regeneration being effected by a regeneration gas comprising the effluent from the second catalytic reaction zone after cooling said effluent to recover elemental sulfur therefrom and after heating said cooled effluent to a temperature sufficiently high to regenerate the catalyst but sufficiently low to avoid damaging the catalyst.

2. The process of claim 1 wherein the effluent temperature of the first catalytic reaction zone is at a temperature in the range of about 550°–700° F. (288°–371° C.);

the inlet temperature of the second catalytic reaction zone is at a temperature in the range of about 350°–450° F. (177°–232° C.);

the inlet temperature of the third catalytic reaction zone is at a temperature in the range from about 250°–280° F. (121°–138° C.);

the inlet temperature of the fourth catalytic reaction zone is at a temperature in the range of about 245°–260° F. (118°–127° C.);

the third catalytic reaction zone and the fourth catalytic reaction zone being operated below the dew point of sulfur for the recovery of sulfur.

3. The process of claim 1 wherein the regeneration gas is at a temperature of about 650° F. (343° C.).

4. An improved process for producing and recovering elemental sulfur from acid gas in a series of four catalytic reaction zones, said process comprising:

(a) reacting acid gas and air in a thermal reaction zone maintained at such conditions so as to facilitate the Claus reaction, to produce elemental sulfur vapor;

(b) cooling the gas produced in the thermal reaction zone to condense the elemental sulfur vapor and recovering elemental sulfur therefrom; then, (c) heating the cooled gas; then, (d) reacting the heated gas, in the presence of a catalyst for facilitating the Claus reaction in a first catalytic reaction zone to produce vaporized elemental sulfur therein, (e) cooling the gas produced in the first catalytic reaction zone to condense the elemental sulfur vapor and recovering elemental sulfur therefrom; then, (f) heating the cooled gas; then, (g) reacting the heated gas, in the presence of a catalyst for facilitating the Claus reaction, in a second catalytic reaction zone to produce vaporized elemental sulfur therein;

(h) cooling the gas produced in the second catalytic reaction zone to condense the elemental sulfur vapor and recovering elemental sulfur therefrom; then, (i) reacting the cooled gas, in the presence of a catalyst for facilitating a Claus reaction to produce elemental sulfur, in a third catalytic reaction zone to produce elemental sulfur on said catalyst, said cooled gas in step (h) being at a temperature sufficiently low to permit the reaction in the third catalytic reaction zone to proceed below the dew point of elemental sulfur;

(j) cooling the gas from the third catalytic reaction zone; then (k) reacting the cooled gas in the presence of a catalyst for facilitating a Claus reaction to produce elemental sulfur, in a fourth catalytic reaction zone to produce elemental sulfur on said catalyst, said cooled gas in step (j) being at a sufficiently low temperature to permit the reaction in the fourth catalytic reaction zone to proceed below the dew point of elemental sulfur; then (l) discharging the gas produced in step (k);

(m) continuing steps (a) through (l), inclusive, until the catalyst loading reaches a predetermined level below that at which the instantaneous recovery of elemental sulfur starts to fall; then (n) heating the cooled gas produced in step (h) to a temperature sufficiently high to allow regeneration of catalyst but sufficiently low to avoid damaging the catalyst to produce a regeneration gas and passing said regeneration gas to the third catalytic reaction zone to regenerate the catalyst therein;

(o) cooling the gas from the third catalytic reaction zone, feeding to to the fourth catalytic reaction zone, reacting the cooled gas in the presence of the catalyst for facilitating a Claus reaction to produce elemental sulfur in the fourth catalytic reaction zone to produce elemental sulfur on said catalyst, said cooled gas being at a sufficiently low temperature to permit the reaction in the fourth catalytic reaction zone to proceed below the dew point of elemental sulfur, and discharging the effluent from the fourth catalytic reaction zone; and (p) periodically switching the positions of the third and the fourth catalytic reaction zones in the series of four catalytic reaction zones steps (n) through (o), inclusive, being carried out only until the catalyst is regenerated in the catalytic reaction zone being regenerated in the third position, step (m) being carried out the rest of the time.

5. The process of claim 4 wherein the gas in step (c) is heated to the temperature in the range of about 480°–550° F. (216°–288° C.), the gas in step (f) is heated to the temperature in the range of about 350°–450° F. (177°–232° C.), the gas in step (k) is at a temperature in the range of about 245°–260° F. (118°–127° C.), and the temperature of the heated gas in step (n) is about 650° F. (343° C.).

6. An improved Apparatus comprising a series of four catalytic reactors for producing and recovering elemental sulfur from acid gas, said Apparatus comprising:

(a) a thermal reactor for reacting acid gas and air at such condition so as to facilitate the Claus reaction and to produce elemental sulfur vapor;

(b) a first condenser, operably connected with the thermal reactor for receiving and for cooling the gas produced in the thermal reaction zone to condense elemental sulfur vapor and for recovering elemental sulfur therefrom;

(c) first means operably connected with the first condenser for receiving and for heating the gas cooled by the first condenser;

(d) a first catalytic reactor operably connected with the first means for receiving and for reacting the heated gas to produce vaporized elemental sulfur therein;

(e) a second condenser operably connected with the first catalytic reactor for receiving and for cooling the gas produced in the first catalytic reactor to condense elemental sulfur vapor and recovering elemental sulfur therefrom;

(f) second means operably connected with the second condenser for receiving and for heating the gas cooled by said second condenser;

(g) a second catalytic reactor operably connected with the second means for receiving and for reacting the heated gas to produce vaporized elemental sulfur therein;

(h) a third condenser operably connected with the second catalytic reactor for receiving and for cooling the gas produced in the second catalytic reactor to condense elemental sulfur vapor and for recovering elemental sulfur therefrom;

(i) third means operably connected with the third condenser for receiving and heating the gas cooled by said third condenser;

(j) a third catalytic reactor operably connected with the third condenser for receiving and for reacting the gas cooled by said third condenser to produce elemental sulfur on said catalyst, said third catalytic reactor being also operably connected with the third means for heating and said third catalytic reactor being maintained at intervals at a temperature sufficiently low to permit the reaction to proceed below the dew point of elemental sulfur;

(k) a fourth catalytic reactor operably connected with the third catalytic reactor for receiving and for reacting the cooled gas to produce elemental sulfur on said catalyst, said fourth catalytic reactor being maintained at intervals at a temperature sufficiently low to permit the reaction to proceed below the dew point of sulfur;

(l) a fourth condenser operably connected with the fourth catalytic reactor for receiving and for cooling the gas from one of the third catalytic reactor and the fourth catalytic reactor;

(m) means for switching the flow of gas from an adsorption mode to a regeneration mode for the third catalytic reactor whenever the catalyst loading reaches a level below that at which the instantaneous recovery of elemental sulfur starts to fall, in the regeneration mode the gas cooled in the third condenser being passed to the third means for heating and the gas heated in the third means for heating being passed to the third catalytic reactor to vaporize elemental sulfur deposited on the catalyst therein and to regenerate said catalyst and the effluent from said third catalytic reactor being passed through the fourth catalytic reactor; and (n) means for switching the positions of the third catalytic reactor and the fourth catalytic reactor in the series of four catalytic reactors.

\* \* \* \* \*

UNITED STATES PATENT OFFICE
CERTIFICATE OF CORRECTION

PATENT NO. : 4,487,754

DATED : December 11, 1984

INVENTOR(S) : Robert L. Reed

It is certified that error appears in the above-identified patent and that said Letters Patent are hereby corrected as shown below:

Column 2, line 6, "absorption" should read --adsorption--;
        line 19, "absorbed" should read --adsorbed--;
        line 48, "absorption" should read --adsorption--;
        lines 53-54, "absorption" should read --adsorption--;
        line 62, "absorbent" should read --adsorbent--.

Column 3, line 17, "absorption" should read --adsorption--.

Column 4, line 7, "absorption" should read --adsorption--.

Column 5, line 34, "absorbed" should read --adsorbed--;
        line 39, "absorbed" should read --adsorbed--.

Column 6, line 7, "absorbed" should read --adsorbed--.

Signed and Sealed this

Thirty-first Day of January, 1989

Attest:

DONALD J. QUIGG

*Attesting Officer*         *Commissioner of Patents and Trademarks*